(12) United States Patent
Han et al.

(10) Patent No.: US 12,715,264 B2
(45) Date of Patent: Aug. 25, 2026

(54) AIR CONDITIONING SYSTEM FOR VEHICLE

(71) Applicants: Hyundai Motor Company, Seoul (KR); Kia Corporation, Seoul (KR)

(72) Inventors: Byeol Han, Suwon (KR); Yoon Hyung Lee, Seongnam (KR); Jae Geun Jeong, Incheon (KR); Myung Hoe Kim, Seoul (KR); Yu Mi Kim, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 159 days.

(21) Appl. No.: 18/606,110

(22) Filed: Mar. 15, 2024

(65) Prior Publication Data

US 2025/0074144 A1 Mar. 6, 2025

(30) Foreign Application Priority Data

Sep. 4, 2023 (KR) ........................ 10-2023-0117074

(51) Int. Cl.
*B60H 1/00* (2006.01)

(52) U.S. Cl.
CPC ....... *B60H 1/0073* (2019.05); *B60H 1/00385* (2013.01); *B60H 1/00742* (2013.01); *B60H 1/00871* (2013.01); *B60H 1/00878* (2013.01)

(58) Field of Classification Search
CPC ............ B60H 1/00742; B60H 1/00871; B60H 1/00878
See application file for complete search history.

(56) References Cited

U.S. PATENT DOCUMENTS

2017/0028811 A1* 2/2017 Jayasundera ........ A61B 5/6893
2021/0061062 A1* 3/2021 Yamamoto ......... B60H 1/00671
2025/0026175 A1* 1/2025 Huang ............... B60H 1/00807

FOREIGN PATENT DOCUMENTS

JP 2007-069770 A 3/2007
KR 20050121562 A * 12/2005 ......... B60H 1/00828

* cited by examiner

*Primary Examiner* — Scott A Browne
*Assistant Examiner* — Josephine Elizabeth Rich
(74) *Attorney, Agent, or Firm* — Fox Rothschild LLP

(57) ABSTRACT

An air conditioning system for a vehicle includes an input device connected to an air conditioning device in which an air conditioning area of conditioned air is allocated to each discharge port; a temperature sensor that detects an indoor temperature or an outdoor temperature; and a controller that stores determination modes, determines a temperature or discharge area of the conditioned air depending on a difference between the indoor temperature and the outdoor temperature, and outputs a control signal to be transmitted to the input device. The air conditioning system can adjust the temperature and discharge direction of the conditioned air based on the outdoor temperature and an air conditioning load to optimize air conditioning efficiency.

17 Claims, 7 Drawing Sheets

(Second determination mode)

| | High load | Medium load | Low load |
|---|---|---|---|
| Heating | A, B | A, B | A, B |
| Mixture of heating and cooling | A, B | A, B | A, B |
| Cooling | B, A | B, A | B, A |

FIG. 3

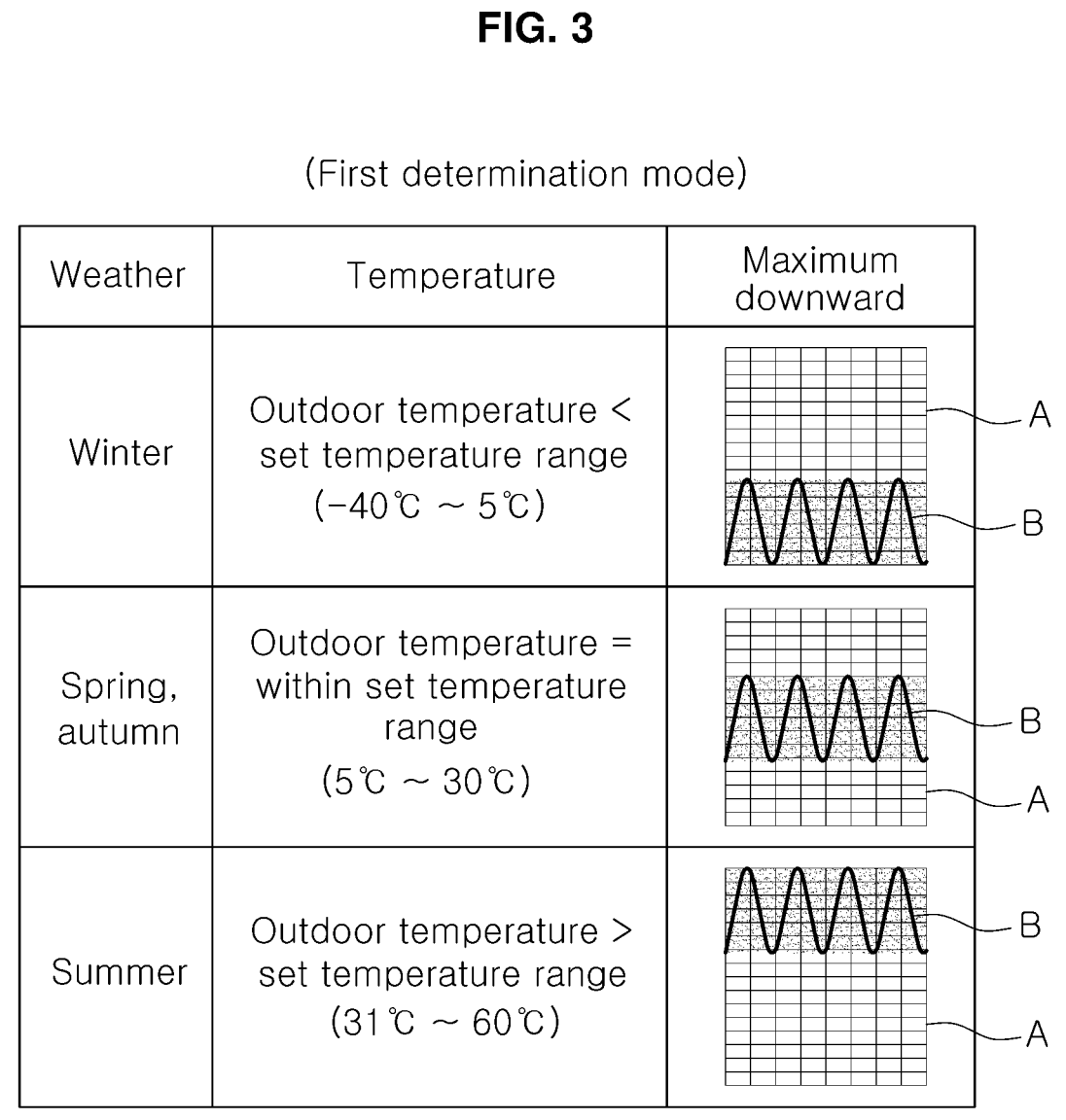

(First determination mode)

| Weather | Temperature | Maximum downward |
|---|---|---|
| Winter | Outdoor temperature < set temperature range (−40℃ ~ 5℃) | A, B |
| Spring, autumn | Outdoor temperature = within set temperature range (5℃ ~ 30℃) | B, A |
| Summer | Outdoor temperature > set temperature range (31℃ ~ 60℃) | B, A |

FIG. 7

| | Low thermal load | Medium thermal load | High thermal load |
| --- | --- | --- | --- |
| Operation | | | |

AIR CONDITIONING SYSTEM FOR VEHICLE

CROSS-REFERENCE TO RELATED APPLICATION

This application claims under 35 U.S.C. § 119 (a) the benefit of Korean Patent Application No. 10-2023-0117074, filed on Sep. 4, 2023 in the Korean Intellectual Property Office, the entire contents of which are incorporated herein by reference.

BACKGROUND

1. Technical Field

The present disclosure relates to an air conditioning system for a vehicle, more particularly, to the air conditioning system configured to adjust a temperature and discharge direction of conditioned air based on various factors such as the outdoor temperature and an air conditioning load.

2. Description of the Related Art

Recently, electric vehicles have emerged as a potential solution to climate change by implementing environmentally friendly technology while avoiding use of fossil fuels. Electric vehicles operate using a motor that receives electricity from a battery and outputs power. Therefore, electric vehicles have advantages of reduced emissions, little noise, and motor efficiency that may be higher than engine efficiency of an internal combustion engine vehicle, and thus they are in the spotlight as eco-friendly vehicles.

In electric vehicles, the core technology is related to battery modules, and recently, research has been actively conducted on weight reduction, miniaturization, and short charging time of batteries. Battery modules need to be used in an optimal temperature environment to maintain optimal performance and long lifespan. However, it is difficult to use battery modules in an optimal temperature environment due to heat generated during operation and external temperature changes.

In addition, electric vehicles do not have waste heat generated during combustion in a separate engine like an internal combustion engine, and thus the interior of the vehicles is heated in the winter using an electric heating device. Further, warm-up is required to improve battery charging and discharging performance in cold weather, and thus a separate coolant heating type electric heater is configured and used. That is, in order to maintain an optimal temperature environment for a battery module, technology for operating a cooling and heating system for battery module temperature control separately from a cooling and heating system for vehicle interior air conditioning is used.

Accordingly, conventionally, two independent cooling and heating systems are built, one is used for indoor cooling and heating, and the other is used for battery module temperature control.

In particular, if the energy efficiency of an electric vehicle is not managed during interior cooling and heating, the cruising range is short, making it impossible to drive a long distance, and the comfort of occupants is reduced because sufficient cooling and heating are not provided.

The matters described as background technology above are only for the purpose of improving understanding of the background of the present disclosure, and should not be taken as recognition that they correspond to prior art already known to those skilled in the art.

SUMMARY

Therefore, the present disclosure provides an air conditioning system for a vehicle which adjusts a temperature and discharge direction of conditioned air based on various factors such as an outdoor temperature and an air conditioning load in providing conditioned air to a vehicle interior to rapidly adjust the indoor temperature to a required temperature, improving air conditioning efficiency and indoor comfort and securing energy efficiency according to the improved air conditioning efficiency.

In accordance with an aspect of the present disclosure, the above and other objects can be accomplished by the provision of an air conditioning system for a vehicle, including an input device operably connected to an air conditioning device in which an air conditioning area of conditioned air is allocated to each discharge port, a temperature sensor configured to detect an indoor temperature or an outdoor temperature, and a controller configured to store a plurality of determination modes, determine a temperature or a discharge area of conditioned air depending on a difference between the indoor temperature and the outdoor temperature according to each determination mode, and output a control signal to be transmitted to the input device.

A discharge direction may be adjusted in vertical and horizontal directions in the air conditioning area to adjust a discharge area.

The air conditioning device may be configured to automatically adjust the discharge direction of conditioned air, and the input device may be able to individually control a conditioned air discharge direction of each discharge port.

In a first determination mode among a plurality of preset determination modes, the controller may determine whether to provide warm air or cold air by comparing the outdoor temperature input through the temperature sensor with a predetermined set temperature range, set a discharge area in a lower part of an air conditioning area upon determining to provide warm air, set the discharge area in an upper part of the air conditioning area upon determining to provide cold air, and output a control signal.

In the first determination mode, the controller may determine to provide warm air if the outdoor temperature is lower than the set temperature range, determine to provide cold air if the outdoor temperature is higher than the set temperature range, and determine to provide a mixture of warm air and cold air if the outdoor temperature is within the set temperature range.

The controller may set the discharge area in a center of the air conditioning area and output a control signal if the outdoor temperature is within the set temperature range.

The controller may output a control signal such that conditioned air is discharged to a maximum horizontal area of the air conditioning area in the first determination mode.

In a second determination mode among the plurality of predetermined set determination modes, the controller may determine an air conditioning load by comparing the indoor temperature with a target discharge temperature and set a vertical range of a discharge area by classifying the air conditioning load into stages.

The controller may set the vertical range of the discharge area such that the vertical range is narrowed as the air conditioning load increases and is widened as the air conditioning load decreases.

In a third determination mode among the plurality of predetermined set determination modes, the controller may derive a temperature difference by comparing the indoor temperature and the outdoor temperature and set a horizontal range of the discharge area depending on the difference between the indoor temperature and the outdoor temperature.

The controller may set the horizontal range of the discharge area such that the horizontal range is narrowed as the difference between the indoor temperature and the outdoor temperature increases and is widened as the difference between the indoor temperature and the outdoor temperatures decreases.

The air conditioning system may further include an occupant detector configured to receive information based on presence or absence and a location of an indoor occupant, wherein the controller performs controls such that conditioned air is discharged only through a discharge port corresponding to a seat where the occupant is present.

The occupant detector may receive thermal information on the indoor occupant, and the controller may set a discharge area such that the discharge area includes the occupant if there is a difference between the temperature of the occupant or surroundings of the occupant and a target discharge temperature.

The controller may output a control signal such that the discharge direction of conditioned air is repeatedly changed to a vertical direction or a horizontal direction within the discharge area.

The controller may set a discharge direction change cycle such that the discharge direction change cycle decreases as the difference between the indoor temperature and the outdoor temperature or the air conditioning load increases and increases as the difference between the indoor temperature and the outdoor temperature or the air conditioning load decreases.

The controller may determine a temperature and a discharge area of conditioned air according to each determination mode when an occupant selects an automatic temperature control mode.

The controller may not perform the automatic temperature control mode if any of a defrost operation, no input of the indoor temperature or the outdoor temperature, automatic temperature control mode off, or ignition off is satisfied.

A vehicle may include the air conditioning system.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 is a diagram illustrating a first determination mode of the air conditioning system for a vehicle according to the present disclosure;

FIG. 7 is a diagram showing discharge direction control depending on a heat load in the air conditioning system for a vehicle according to the present disclosure.

DETAILED DESCRIPTION OF THE PREFERRED EMBODIMENTS

Figure 1:
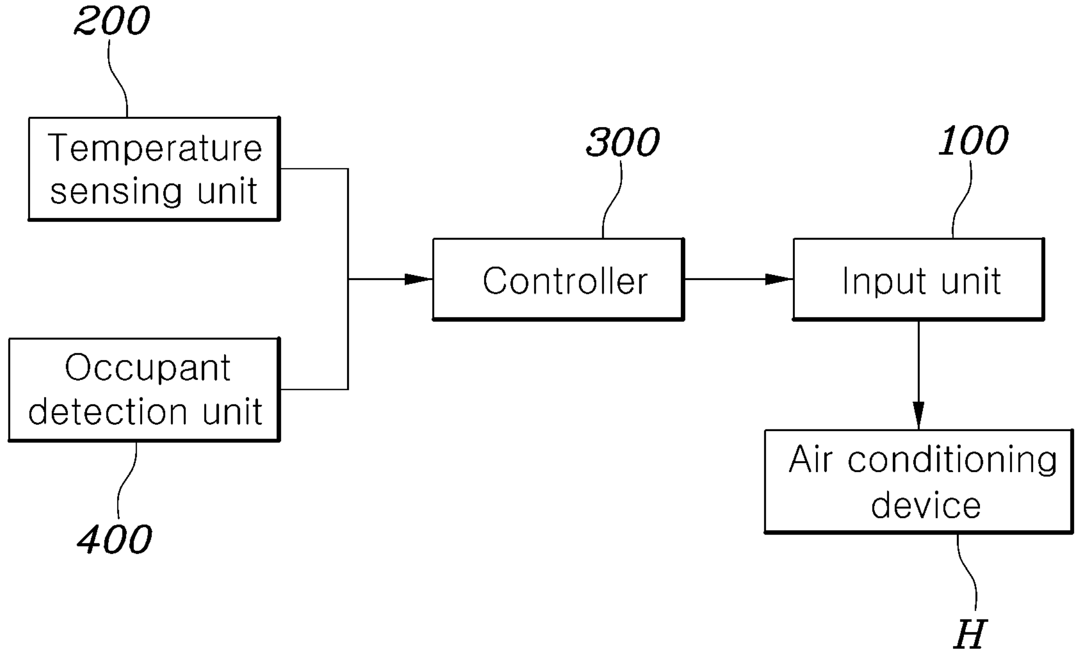
FIG. 1 is a configuration diagram of an air conditioning system for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the accompanying drawings, but the same or similar components are denoted by the same reference numerals and redundant descriptions thereof will be omitted.

In the following description of the embodiments disclosed in the present specification, a detailed description of known functions and configurations incorporated herein will be omitted when it may obscure the subject matter of the present disclosure. In addition, the accompanying drawings are provided only for ease of understanding of the embodiments disclosed in the present specification, do not limit the technical spirit disclosed herein, and include all changes, equivalents and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is intended to include a plurality of elements unless the context clearly indicates otherwise.

A controller may include a communication device that communicates with other controllers or sensors to control functions thereof, a memory that stores an operating system, logic commands, input/output information, and the like, and one or more processors that perform determinations, calculations, and decisions necessary to control the functions.

Hereinafter, an air conditioning system for a vehicle according to a preferred embodiment of the present disclosure will be described with reference to the attached drawings.

As shown in FIG. 1, the air conditioning system for a vehicle according to the present disclosure includes an input unit 100 (or "input device") for controlling an air conditioning device H in which an air conditioning area A is allocated to each discharge port 2 and a discharge direction can be adjusted in vertical and horizontal directions in each air conditioning area A to adjust a discharge area B, a temperature sensing unit 200 (or "temperature sensor") that receives the indoor or outdoor temperature, and a controller 300 that stores a plurality of determination modes, determines a temperature and a discharge area B of conditioned air depending on a difference between the indoor temperature and the outdoor temperature according to each determination mode and outputs a control signal to be transmitted to the input unit 100.

As provided herein, the input unit 100, the temperature sensing unit 200 and/or the controller 300 may constitute modules and/or devices of the air conditioning system, and may constitute one or more controllers. For example, the above units of the air conditioning system may constitute hardware components that form part of a controller (e.g., modules or devices of a high-level controller), or may constitute individual controllers each having a processor and memory. The air conditioning system may include one or more processors and memory.

The air conditioning device H according to the present disclosure receives cold air or warm air from HVAC and allows cold air or warm air to be provided to the vehicle interior.

That is, the air conditioning device H is a vent device and includes a plurality of discharge ports 2 such that conditioned air can be provided to an indoor occupant. An air conditioning area is allocated to each discharge port 2, and the air conditioning area A can be generated such that it includes the occupant.

Figure 2:
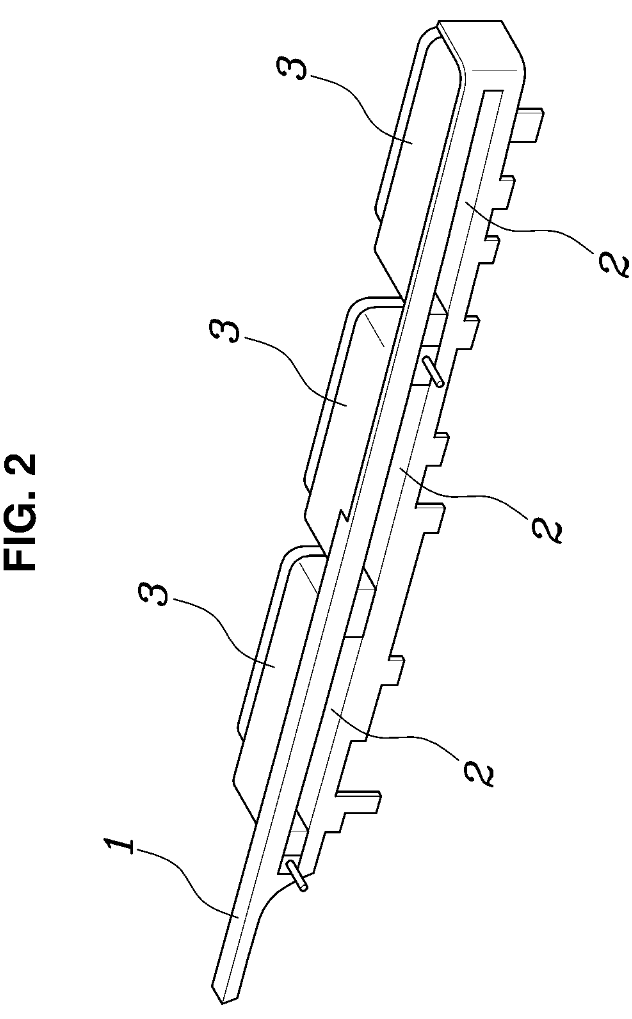
FIG. 2 is a diagram showing an air conditioning device according to an embodiment of the present disclosure.
Figure 4:
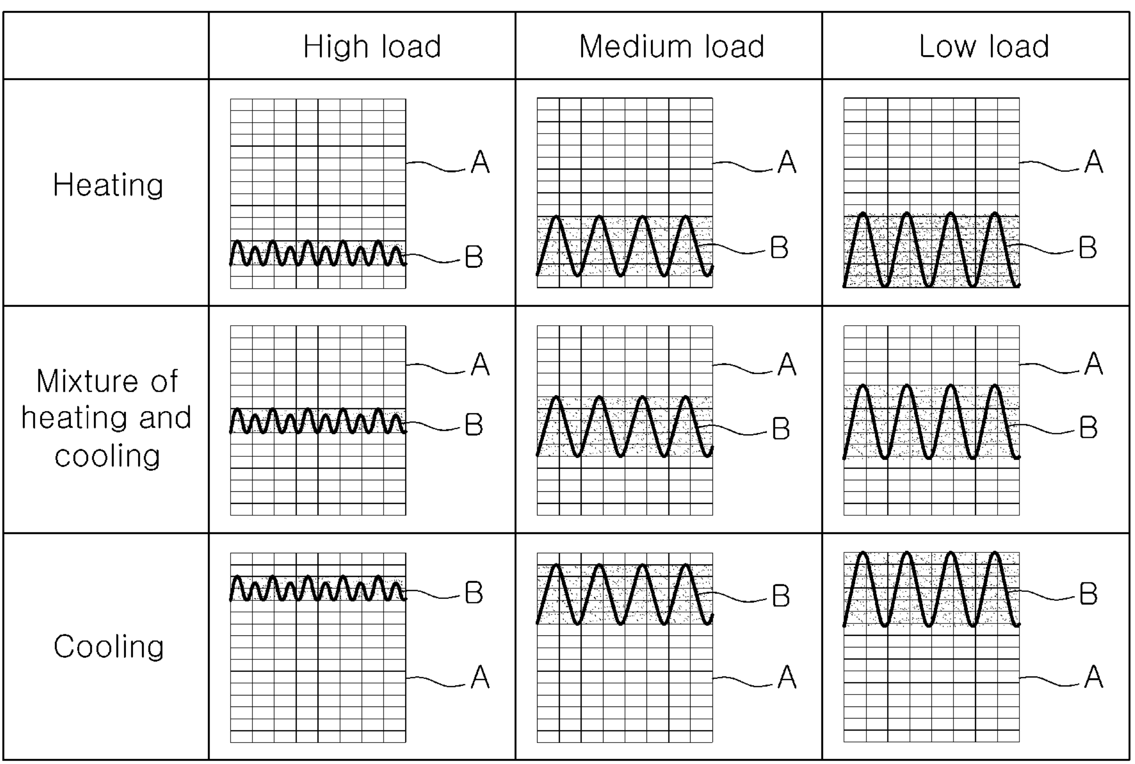
FIG. 4 is a diagram illustrating a second determination mode of the air conditioning system for a vehicle according to the present disclosure.

In addition, the air conditioning device H may be configured as a fully automatic vent device in which the discharge direction of conditioned air is automatically adjusted. As shown in FIG. 2, the air conditioning device H includes a plurality of discharge ports 2 in a case 1, each discharge port 2 is provided with a flap to guide the discharge direction of conditioned air, and the position of the flap may be adjusted by a driving unit 3.

The air conditioning device H can fully automatically adjust the discharge direction of conditioned air in vertical and horizontal directions, and the air conditioning device H may be applied in various embodiments.

The input unit 100 is provided to control the air conditioning device H and adjusts the position of the discharge area B in the air conditioning area A.

The input unit 100 can individually control a conditioned air discharge direction of each discharge port 2, and optimize the discharge direction of conditioned air discharged through each discharge port 2 depending on various situations.

The temperature sensing unit 200 may receive outdoor temperature information through a temperature sensor provided outside a vehicle, or may receive indoor temperature information through a temperature sensor provided indoors. As provided herein, the temperature sensing unit 200 refers to one or more sensors provided inside and/or outside the vehicle, and may further include a processor and/or memory for storing the temperature information.

The controller 300 transmits a control signal to the input unit 100 on the basis of information input through the temperature sensing unit 200 such that the position of the discharge area B is adjusted. Here, the controller 300 may further receive information on a temperature set by a user or an automatically set temperature.

The controller 300 stores a plurality of determination modes for determining a location of the discharge area B, determines a temperature and the discharge area B of conditioned air depending on a difference between the indoor temperature and the outdoor temperature according to each determination mode, and outputs a control signal to be transmitted to the input unit 100.

The controller 300 may determine the temperature and discharge area B of conditioned air according to each determination mode when an occupant selects an automatic temperature control mode.

The automatic temperature control mode requires an occupant to set the mode to be performed, and thus even if the automatic temperature control mode is performed and the discharge direction of conditioned air is adjusted, the occupant is aware of this and does not feel uncomfortable.

In addition, the controller 300 does not perform the automatic temperature control mode if any of a defrost operation, no input of the indoor temperature or outdoor temperature, automatic temperature control mode off, or ignition off is satisfied.

That is, the automatic temperature control mode is performed in a state in which a defrost mode is turned off and indoor temperature and outdoor temperature information is normally collected.

The defrost mode can be used in certain situations. The defrost mode is given priority and the automatic temperature control mode is not performed when the defrost mode is performed.

In addition, if indoor temperature information and outdoor temperature information are abnormal, errors may occur in controlling the temperature and discharge direction of conditioned air, and thus the automatic temperature control mode is performed in a case where indoor temperature information and outdoor temperature information are normally input.

The determination modes preset in the controller 300 may include differences between the indoor temperature and the outdoor temperature, air conditioning loads, and the like, and indoor air conditioning efficiency can be improved and air conditioning satisfaction of an occupant can be secured by controlling the discharge direction of conditioned air according to each condition.

The present disclosure with respect to this is described in detail. In a first determination mode among the plurality of preset determination modes, the controller 300 may compare the outdoor temperature input through the temperature sensing unit 200 with a preset temperature range to determine whether to provide warm air or cold air, set a discharge area B in a lower part of the air conditioning area A upon determining to provide warm air, set the discharge area B in an upper part of the air conditioning area A upon determining to provide cold air, and output a control signal.

The first determination mode is for determining whether to provide warm air or cold air by comparing the indoor temperature and the outdoor temperature, and is used to set an optimized discharge area B for providing warm air or cold air. Accordingly, weather information may be further collected in the first determination mode.

That is, in the first determination mode, the controller 300 compares the outdoor temperature with a predetermined set temperature range. The set temperature range is a temperature range excluding cold or hot weather conditions and may be set to 5° C. to 30° C. The set temperature range may be set to various temperature values.

Accordingly, the controller 300 determines that heating will be required when the outdoor temperature is lower than the set temperature range and determine to provide warm air. The controller 300 determines that cooling will be required when the outdoor temperature is higher than the set temperature range and determines to provide cold air. In addition, when the outdoor temperature is within the set temperature range, the controller 300 adjusts the indoor temperature based on the set temperature range upon determining to provide a mixture of cold air and warm air. Here, when comparing the outdoor temperature with the set temperature range, it is possible to determine whether to provide warm air or cold air if the outdoor temperature is higher or lower than the set temperature range by a certain amount in determining whether the outdoor temperature is higher or lower than the set temperature range.

In particular, as shown in FIG. 2, when the controller 300 determines to provide warm air, the controller 300 sets the discharge area B in the lower part of the air conditioning area A. Accordingly, warm air provided from the air conditioning device H moves downward to the air conditioning area A and then spreads upward, thereby improving indoor heating efficiency.

Further, when the controller 300 determines to provide cold air, the controller 300 sets the discharge area B in the upper part of the air conditioning area A. Accordingly, the cold air provided from the air conditioning device H moves upward to the air conditioning area A and then spreads downward, thereby improving indoor cooling efficiency.

In addition, when the controller 300 determines to provide a mixture of warm air and cold air, the controller 300 sets the discharge area B in a center of the air conditioning area A such that the indoor temperature can be maintained at a temperature required by the occupant.

In this manner, the controller 300 sets the temperature of conditioned air provided to the vehicle interior according to the outdoor temperature and outputs a control signal to adjust the location of the discharge area B in the air conditioning area A depending on the temperature of conditioned air, and thus cooling and heating efficiency can be improved and occupant comfort can be enhanced.

The controller 300 may output a control signal such that conditioned air is discharged to a maximum horizontal area of the air-conditioning area A in the first determination mode.

In this manner, when the controller 300 provides conditioned air according to the first determination mode, the controller 300 causes conditioned air to be discharged to the maximum horizontal area of the air conditioning area A such that warm air or cold air spreads over a wide range indoors to rapidly adjust the indoor temperature.

That is, the discharge area B may be set to a maximum range on the left and right sides in the air conditioning area A of the air conditioning device H such that conditioned air can be provided to the occupants and the surrounding area.

In the case of the second determination mode among the plurality of preset determination modes, the controller 300 may determine an air conditioning load by comparing a target discharge temperature with the indoor temperature, classifies the air conditioning load into stages, and determine a vertical range of a discharge area B.

That is, in the second determination mode, the controller 300 compares a target discharge temperature of conditioned air to be provided to the vehicle interior through the air conditioning device H with the indoor temperature. The target discharge temperature may be a temperature set directly by the occupant or may be a temperature set automatically.

Accordingly, the controller 300 may determine an air conditioning load depending on the difference between the target discharge temperature and the indoor temperature, determine that the air conditioning load is high if the difference between the target discharge temperature and the indoor temperature is large, and determine that the air conditioning load is low if the difference between the target discharge temperature and the indoor temperature is small.

Here, the controller 300 can classify the air conditioning load into stages and adjust the discharge area B in the air conditioning area A to the vertical range.

As shown in FIG. 3, the controller 300 may limit the discharge area B of conditioned air and provide concentrated conditioned air or provide conditioned air over a wide range by adjusting the vertical range of the discharge area B according to the air conditioning load.

Specifically, the controller 300 may set the vertical range of the discharge area B such that the vertical range is narrowed as the air conditioning load increases and is widened as the air conditioning load decreases.

That is, in a situation in which the air conditioning load is high, the indoor temperature needs to be changed rapidly, and thus the vertical range of the discharge area B is narrowed such that conditioned air is discharged in a narrow range in the discharge direction. Accordingly, the conditioned air is distributed intensively toward the discharge area B which is set as a space that affects changes in the indoor temperature and thus can rapidly change the indoor temperature.

In addition, a situation in which the air conditioning load is low is a state in which the indoor temperature is stabilized, and thus the vertical range of the discharge area B is widened such that the conditioned air is discharged widely in the discharge direction. Accordingly, the conditioned air can spread over a wide area indoors and thus can efficiently maintain the indoor temperature.

In the third determination mode among the plurality of preset determination modes, the controller 300 may compare the outdoor temperature and the indoor temperature to derive a temperature difference, and set the horizontal range of the discharge area B depending on the temperature difference.

That is, in the third determination mode, the controller 300 compares the outdoor temperature and the indoor temperature to check the temperature difference.

Accordingly, the controller 300 can check whether there is heat loss according to the difference between the outdoor temperature and the indoor temperature, determine that there is a large amount of heat loss if the difference between the outdoor temperature and the indoor temperature is large, and determine that there is a small amount of heat loss if the difference between the outdoor temperature and the indoor temperature is small.

Here, the controller 300 may set the horizontal range of the discharge area B such that the horizontal range is narrowed as the difference between the indoor temperature and the outdoor temperature increases and is widened as the temperature difference decreases.

Figure 5:
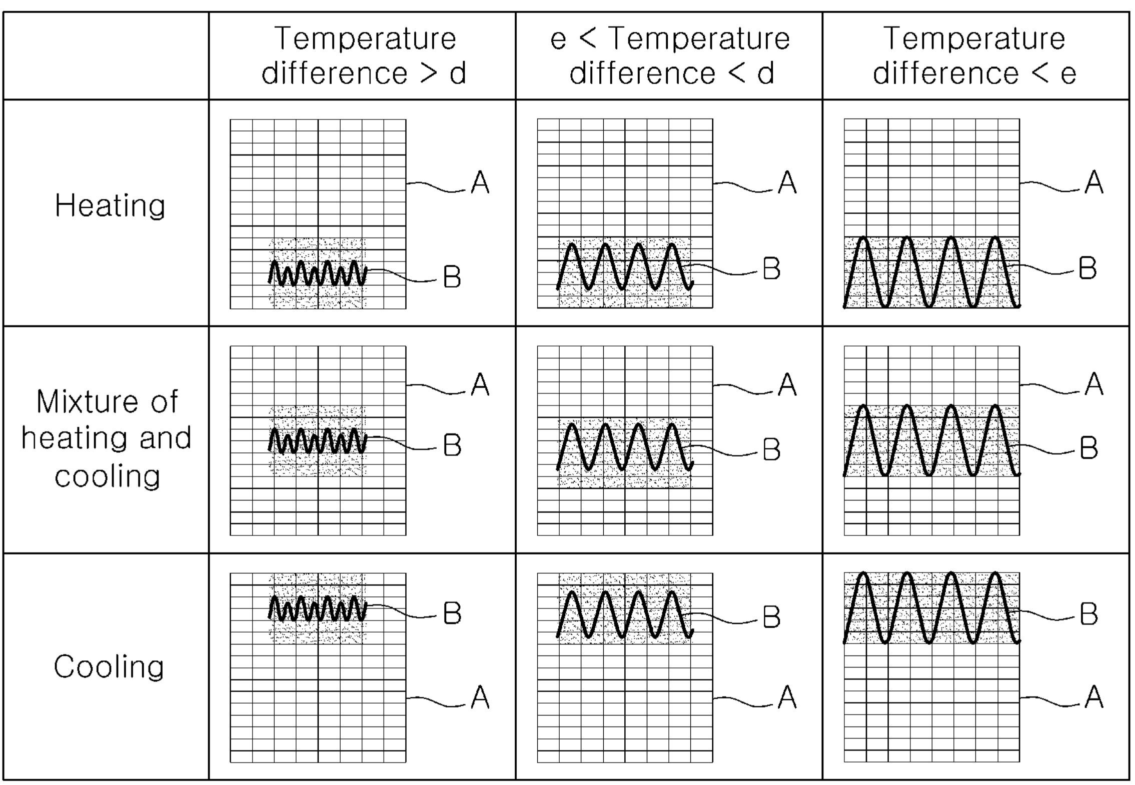
FIG. 5 is a diagram illustrating a third determination mode of the air conditioning system for a vehicle according to the present disclosure.

As shown in FIG. 5, the controller 300 may limit the discharge area B of air-conditioned air to concentrate the conditioned air or provide the conditioned air in a wide range by adjusting the horizontal range of the discharge area B according to the difference between the outdoor temperature and the indoor temperature.

That is, in a situation in which the difference between the outdoor temperature and the indoor temperature is large, the indoor temperature needs to be rapidly changed, and thus the horizontal range of the discharge area B is narrowed such that conditioned air is discharged in a narrow range in the discharge direction. Accordingly, the conditioned air is distributed intensively toward the discharge area B which is set as a space that affects changes in the indoor temperature and thus can rapidly change the indoor temperature.

In addition, a case in which the difference between the outdoor temperature and the indoor temperature is small corresponds to a state in which the indoor temperature is stabilized, and thus the horizontal range of the discharge area B is increased such that the conditioned air is discharged widely in the discharge direction. Accordingly, the conditioned air can spread over a wide area indoors and thus can efficiently maintain the indoor temperature.

Each determination mode of the controller 300 may be implemented as a single determination, or two or more determination modes may be implemented simultaneously or sequentially such that control according to the determination mode is performed.

Meanwhile, the air conditioning system may further include an occupant detection unit 400 (or "occupant detector") that receives information based on presence or absence and the position of an indoor occupant. The occupant detection unit 400 can ascertain the presence or absence and position of an indoor occupant through various sensors including a camera or a seat detection sensor.

Here, the controller 300 may control conditioned air such that the conditioned air is discharged only through a discharge port 2 corresponding to the seat where the occupant is present.

For example, in a case in which there is only an occupant sitting on the driver's seat, if conditioned air is provided to other spaces including the passenger seat, air conditioning efficiency and energy efficiency deteriorate. Therefore, if there is only an occupant in the driver's seat, conditioned air is provided only to the air conditioning area A corresponding to the driver's seat, thereby preventing the efficiency of conditioned air from decreasing and providing comfort to the occupant.

Further, the occupant detection unit 400 may receive thermal information on an indoor occupant. That is, the occupant detection unit 400 may detect the temperature of the occupant and the temperature around the occupant through a thermal imaging camera installed in the vehicle interior.

Accordingly, the controller 300 compares the difference between the temperature of the occupant or surroundings of the occupant with a target discharge temperature, and if there is a difference between the temperature of the passenger and the target discharge temperature, causes the discharge area B to include the occupant in the air conditioning area A corresponding to the occupant.

Figure 6:
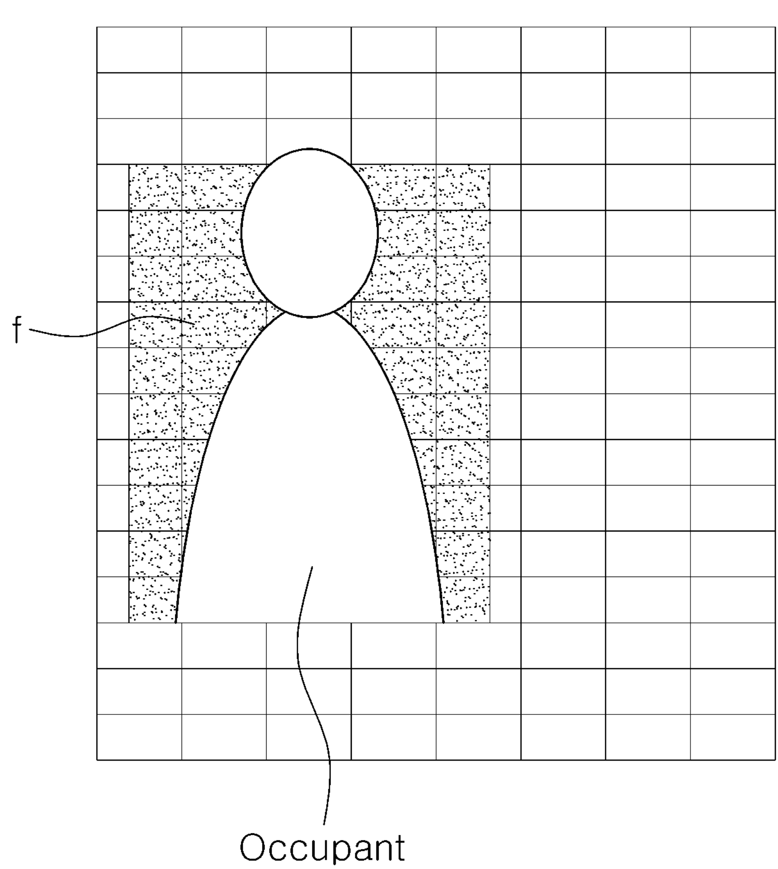
FIG. 6 is a diagram illustrating control depending on an occupant temperature of the air conditioning system for a vehicle according to the present disclosure.

For example, as shown in FIG. 6, the controller 300 may compare the temperature f around an occupant and a target discharge temperature through the occupant detection unit 400, and if the difference between the temperature of the occupant side and the target discharge temperature is a certain amount or more, set the discharge area B such that it includes the occupant, thereby rapidly satisfying a required temperature of the occupant while reducing a thermal load.

Further, the controller 300 may output a control signal such that the discharge direction of conditioned air is repeatedly changed to the vertical direction or the horizontal direction within the discharge area B.

In this manner, the discharge direction of the conditioned air discharged from the air conditioning device H is repeatedly changed to the vertical direction and the horizontal direction within the discharge area B, and thus the conditioned air can be provided to the entire discharge area B.

In particular, the controller 300 may set a discharge direction change cycle such that it decreases as the difference between the indoor temperature and the outdoor temperature or an air conditioning load increases and increases as the temperature difference or the air conditioning load decreases.

As shown in FIG. 7, the controller 300 may compare the outdoor temperature and the indoor temperature to check the indoor/outdoor temperature difference and an air conditioning load.

Accordingly, the controller 300 may set a short discharge direction change cycle in the discharge area B if the difference between the outdoor temperature and the indoor temperature and the air conditioning load are high such that conditioned air is concentrated in the discharge area B and is uniformly distributed, and thus the temperature of the space corresponding to the discharge area B can be rapidly changed.

In addition, the controller 300 may set a long discharge direction change cycle in the discharge area B if the difference between the outdoor temperature and the indoor temperature and the air conditioning load are low such that conditioned air spreads relatively slowly in the discharge area B, and thus the temperature of the space corresponding to the discharge area B can be maintained stably.

The air conditioning system for automotive vehicles having the above-described structure adjusts a temperature and discharge direction of conditioned air based on various factors such as outdoor temperature and air conditioning loads in providing conditioned air to a vehicle interior to rapidly adjust an indoor temperature to a required temperature, which can improve air conditioning efficiency and indoor comfort while securing energy efficiency according to the improved air conditioning efficiency.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An air conditioning system for a vehicle, the air conditioning system comprising:

a vent device including a plurality of discharge ports;

an input device operably connected to an air conditioning device in which an air conditioning area of conditioned air is allocated to each discharge port;

a temperature sensor configured to detect an indoor temperature or an outdoor temperature; and a controller configured to store a plurality of determination modes, determine a temperature or a discharge area of the conditioned air depending on a difference between the indoor temperature and the outdoor temperature according to each of the determination modes, and output a control signal to be transmitted to the input device, wherein, in a second determination mode among the plurality of determination modes, the controller determines an air conditioning load by comparing the indoor temperature with a target discharge temperature and sets a vertical range of the discharge area by classifying the air conditioning load into stages.

2. The air conditioning system of claim 1, wherein a discharge direction of the conditioned air is adjusted in vertical and horizontal directions in the air conditioning area to adjust the discharge area.

3. The air conditioning system of claim 2, wherein the air conditioning device is configured to automatically adjust the discharge direction of the conditioned air, and the input device is able to individually control a conditioned air discharge direction of each discharge port.

4. The air conditioning system of claim 1, wherein, in a first determination mode among the plurality of determination modes, the controller determines whether to provide warm air or cold air by comparing the outdoor temperature input through the temperature sensor with a predetermined set temperature range, sets the discharge area in a lower part of the air conditioning area upon determining to provide the warm air, sets the discharge area in an upper part of the air conditioning area upon determining to provide the cold air, and outputs the control signal.

5. The air conditioning system of claim 4, wherein, in the first determination mode, the controller determines to provide the warm air if the outdoor temperature is lower than the set temperature range, determines to provide the cold air if the outdoor temperature is higher than the set temperature range, and determines to provide a mixture of the warm air and the cold air if the outdoor temperature is within the set temperature range.

6. The air conditioning system of claim 5, wherein the controller sets the discharge area in a center of the air conditioning area and outputs the control signal if the outdoor temperature is within the set temperature range.

7. The air conditioning system of claim 4, wherein the controller outputs the control signal such that the conditioned air is discharged to a maximum horizontal area of the air conditioning area in the first determination mode.

8. The air conditioning system of claim 1, wherein the controller sets the vertical range of the discharge area such that the vertical range is narrowed as the air conditioning load increases and is widened as the air conditioning load decreases.

9. The air conditioning system of claim 1, wherein, in a third determination mode among the plurality of determination modes, the controller derives a temperature difference by comparing the indoor temperature and the outdoor temperature and sets a horizontal range of the discharge area depending on the difference between the indoor temperature and the outdoor temperature.

10. The air conditioning system of claim 9, wherein the controller sets the horizontal range of the discharge area such that the horizontal range is narrowed as the difference between the indoor temperature and the outdoor temperature increases and is widened as the difference between the indoor temperature and the outdoor temperatures decreases.

11. The air conditioning system of claim 1, further comprising an occupant detector configured to receive information based on presence or absence and a location of an indoor occupant, wherein the controller performs controls such that the conditioned air is discharged only through a discharge port corresponding to a seat where the occupant is present.

12. The air conditioning system of claim 11, wherein the occupant detector receives thermal information on the indoor occupant, and the controller sets the discharge area such that the discharge area includes the occupant if there is a difference between the temperature of the occupant or surroundings of the occupant and a target discharge temperature.

13. The air conditioning system of claim 1, wherein the controller outputs the control signal such that a discharge direction of the conditioned air is repeatedly changed to a vertical direction or a horizontal direction within the discharge area.

14. The air conditioning system of claim 13, wherein the controller sets a discharge direction change cycle such that the discharge direction change cycle decreases as the difference between the indoor temperature and the outdoor temperature or the air conditioning load increases and increases as the difference between the indoor temperature and the outdoor temperature or the air conditioning load decreases.

15. The air conditioning system of claim 1, wherein the controller determines a temperature and the discharge area of the conditioned air according to each of the determination modes when an occupant selects an automatic temperature control mode.

16. The air conditioning system of claim 15, wherein the controller does not perform the automatic temperature control mode if any of a defrost operation, no input of the indoor temperature or the outdoor temperature, automatic temperature control mode off, or ignition off is satisfied.

17. A vehicle comprising the air conditioning system of claim 1.

* * * * *